Patented Apr. 25, 1939

2,155,862

UNITED STATES PATENT OFFICE 2,155,862

DUPLICATING INK

William Jonse Hughes, Brooklyn, N. Y., assignor to Manifold Supplies Company, Brooklyn, N. Y., a corporation of New York No Drawing. Application January 15, 1936, Serial No. 59,314

3 Claims. (Cl. 134—31)

The present invention relates to an improvement in duplicating inks. One object thereof has been to provide a duplicating ink or composition which will produce black copies of written or printed records or the like in connection with the use of well known duplicating or multiplying methods wherein the markings in ink or colored composition forming the matter to be copied or multiplied are printed, impressed, deposited or stencilled upon a suitable master sheet or record. In making copies from such master sheets or records, the deposits or markings of soluble ink thereon are moistened by application of a suitable solvent and prints are made by contacting fresh sheets with said moistened ink markings according to various methods in general practice such as the Ditto or Hectograph process which employs an aqueous solvent supplied by moistened gelatin compound, or by contacting said ink markings or master matter with fresh sheets previously moistened with some solvent such as water for the copying machine process or spirit solutions for the spirit process which is exemplified in Ritzerfeld's Patent No. 1,645,930 or in Storck's Patent No. 1,964,933.

This invention is especially concerned with a duplicating ink which produces black prints or copies when used in the "spirit process". Also, instead of using the single dye of black color, this ink involves various colors other than black but which, in proper combination, produce a black print or copy when employed in said "spirit process".

To obtain the substantially black prints or copies above referred to, I use as the soluble coloring ingredient in my composition a mixture of the dyes, crystal violet (salt of hexamethyl-pararosaniline), brilliant or ethyl green (salt of tetraethyl diamidotriphenyl-carbinol), magenta (mixture of pararosaniline and rosaniline), and chrysoidine (salt of diamido azo benzene). The above ingredients in finely divided condition are mixed with a suitable vehicle or medium in such proportions that their combined effect is to produce copies of a black hue when use in duplicating processes as above explained.

A preferred embodiment of my duplicating composition includes a dye content consisting of a mixture of the aforesaid dyes in relative amounts as follows:

| | Pounds |
|---|---|
| Crystal violet | 11 |
| Brilliant or ethyl green | 13½ |
| Magenta | 5 |
| Chrysoidine | 15½ |
| | 45 |

The foregoing formula or composition of dyes is used as the coloring agent in my improved duplicating inks to produce black copies, although the medium or vehicle for the dyes will vary to fit different adaptations or conditions of use. For example, where the carrier is in the form of a sheet, as of so-called carbon paper, the ink composition is employed as a coating thereon. In the case of a typewriter ribbon or the like, the fabric base is impregnated with the composition; and where the master sheet or record is to be printed, as from type or plates, the composition is in the form of a printing ink.

Those embodiments of my invention more particularly adapted for use as coatings for carbon paper are included in the subject matter of my co-pending application Serial No. 59,313 filed January 15, 1936.

Where my improved composition is to be embodied in an ink suitable for application to typewriter ribbons or the like, I mix the aforesaid 45 pounds of dye content with a medium consisting of 50 pounds of castor oil or equivalent material to produce a ribbon ink having properties suitable for general use. It will be understood that other oily substances known in the art may be substituted in whole or in part for the castor oil, and that the ratio of dye content to medium may be varied to suit different conditions of use. For example, more medium will produce a more fluid product, desirable in some cases, while less medium will produce a thicker or less fluid product. These considerations are well known and understood by those engaged in the manufacture of typewriter ribbons and the like.

To make my improved composition in the form of an ink for use in printing press operations, I mix the aforesaid 45 pounds of dye content with about 32 pounds of a suitable oily medium, as #3 lithographic varnish, to produce a general utility duplicating printing ink. The quantitative ratio of dyes to the oily medium may be varied to vary the "working" properties of the ink or to produce more or less intense color yielding properties, when the master sheet bearing the printed record is used in duplicating or copy multiplying methods. Likewise lithographic varnishes of different degrees of viscosity, commonly expressed in the trade by numbers as 6, 5, 1, 0, 00, 000 etc., may be employed as a medium to suit the requirements of different printing conditions. These considerations are known and understood by those engaged in the manufacture and use of printing inks.

Whether the record to be copied in multiple be produced by the ribbon ink or by the printing ink, as above described, the resulting copies are uniformly of black hue.

I claim—

1. A duplicating ink comprising a mixture of dyes including chrysoidine, brilliant green, magenta and crystal violet in relative proportions to form a soluble coloring agent which, when the ink is employed as a record to be copied in a duplicating process, produces copies or prints of substantially black hue.

2. A duplicating ink according to claim 1 and including castor oil in which the dyes are dispersed in finely divided condition, the ratio of dyes to medium being such as to render the ink suitable for application to a typewriter ribbon or the like.

3. A duplicating ink according to claim 1 and including lithographic varnish in which the dyes are dispersed in finely divided condition to form an ink of a consistency suitable for printing.

WILLIAM JONSE HUGHES.